United States Patent
Vasudevan et al.

(10) Patent No.: US 9,187,665 B2
(45) Date of Patent: Nov. 17, 2015

(54) INKJET INK WITH SELF-DISPERSED PIGMENT

(75) Inventors: Sundar Vasudevan, Corvallis, OR (US); Richard J Mcmanus, Corvallis, OR (US); Palitha Wickramanayake, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 59 days.

(21) Appl. No.: 13/577,980

(22) PCT Filed: Mar. 15, 2010

(86) PCT No.: PCT/US2010/027370
§ 371 (c)(1),
(2), (4) Date: Aug. 9, 2012

(87) PCT Pub. No.: WO2011/115614
PCT Pub. Date: Sep. 22, 2011

(65) Prior Publication Data
US 2012/0329921 A1 Dec. 27, 2012

(51) Int. Cl.
| | | |
|---|---|---|
| C08G 18/08 | (2006.01) |
| C08G 18/80 | (2006.01) |
| C08G 73/10 | (2006.01) |
| C08K 3/20 | (2006.01) |
| C08K 5/06 | (2006.01) |
| C08K 5/34 | (2006.01) |
| C08K 5/48 | (2006.01) |
| C08L 75/00 | (2006.01) |
| C09D 5/00 | (2006.01) |
| C09D 11/00 | (2014.01) |
| C09D 11/10 | (2014.01) |
| C09D 11/38 | (2014.01) |
| C08K 5/09 | (2006.01) |
| C09D 11/324 | (2014.01) |

(52) U.S. Cl.
CPC . *C09D 11/38* (2013.01); *C08K 5/09* (2013.01); *C09D 11/324* (2013.01); *C08K 2201/00* (2013.01)

(58) Field of Classification Search
CPC ........ C09D 11/38; C09D 11/324; C08K 5/09; C08K 2201/00
USPC ............ 523/160, 161; 524/86, 104, 376, 377, 524/591, 839, 840
See application file for complete search history.

(56) References Cited

U.S. PATENT DOCUMENTS

| | | | |
|---|---|---|---|
| H2113 H | 7/2003 | Garland et al. |
| 6,852,156 B2 * | 2/2005 | Yeh et al. ..................... 106/31.6 |
| 6,908,185 B2 * | 6/2005 | Chen et al. ........................ 347/96 |
| 2007/0225400 A1 * | 9/2007 | Schmid et al. ................ 523/160 |
| 2009/0020035 A1 | 1/2009 | Jackson |
| 2009/0095202 A1 | 4/2009 | Fechner et al. |
| 2009/0098292 A1 | 4/2009 | Tyrell |
| 2010/0055322 A1 | 3/2010 | Brust et al. |

FOREIGN PATENT DOCUMENTS

| | | |
|---|---|---|
| CN | 1542066 (A) | 11/2004 |
| CN | 101434766 (A) | 5/2009 |
| EP | 1 486 541 | 12/2004 |
| EP | 2 075 293 | 7/2009 |
| JP | H0741720 (A) | 2/1995 |
| JP | 2002-079659 | 3/2002 |
| JP | 2002-201390 | 7/2002 |
| JP | 2004-115803 | 4/2004 |
| JP | 2004 149600 | 5/2004 |
| JP | 2004 175918 | 6/2004 |
| JP | 2005-515289 | 5/2005 |
| JP | 2005-226073 | 8/2005 |
| JP | 2007516317 | 6/2007 |
| JP | 2009 215506 | 9/2009 |
| JP | 2009-534506 | 9/2009 |
| JP | 2009197211 | 9/2009 |
| LR | WO-01/94476 | 12/2001 |
| WO | WO-03/062331 | 7/2003 |
| WO | WO-2008/130626 | 10/2008 |
| WO | WO2009/079070 | 6/2009 |

OTHER PUBLICATIONS

International Search Report and Written Opinion for PCT/US2010/027370 dated Jan. 16, 2011 (9 pages).
International Search Report and Written Opinion for PCT/US2010/027370 dated Feb. 11, 2014 (7 pages).
The Notification of the First Office Action and Search Report for Application No. 201080063744.8, State Intellectual Property Office of P.R. China, Issuing Aug. 27, 2013, 9 pages.

* cited by examiner

*Primary Examiner* — Patrick Niland
(74) *Attorney, Agent, or Firm* — Hewlett-Packard Patent Department

(57) ABSTRACT

An ink composition for inkjet printing is disclosed herein. The ink composition includes a self-dispersed carbon black pigment with alkali metal counter ions, polyurethane, and an aqueous carrier. The aqueous carrier includes water, at least one water-soluble organic solvent, and at least one surfactant. In one embodiment, the aqueous carrier further includes an additive having a polar head group and a $C_8$-$C_{18}$ hydrocarbon tail.

14 Claims, No Drawings

INKJET INK WITH SELF-DISPERSED PIGMENT

BACKGROUND

Inkjet printing is a non-contact printing process in which droplets of ink are ejected from an ink pen equipped with printhead nozzles onto a media substrate (e.g. paper) to form an image. Inkjet inks may be dye-based or pigment-based and are characterized by certain required properties such as color, jettability, drying time, long term storage stability, decap time (the amount of time a printhead can be left uncapped and idle and can still fire ink droplets properly), etc.

DETAILED DESCRIPTION

Pigment-based inks are increasingly used in inkjet printers because of their many advantages such as excellent color strength, water fastness, etc. However, as pigments are colorant particles suspended (dispersed) in the ink vehicle (or liquid carrier), they tend to settle after being unused for an extended period of time. Such pigment settling causes clogging of the nozzles at the lower end of the ink pen, resulting in less than optimal printing performance, e.g. print swath having less than optimum height. If this settling is not catastrophic, the nozzles may be recovered by successive steps of pen servicing in the printer. Capped recovery refers to the recovery process after being idle, but the nozzles remain capped during idling. Degree of difficulty in recovery is related to the amount of pen servicing that is required after the ink is in capped storage for an extended period of time.

Disclosed herein is a novel pigment-based ink composition for inkjet printing which is comprised of: a self-dispersed carbon black pigment with alkali metal counter ions, polyurethane and an aqueous carrier. The unique combination of components in this novel ink composition yields excellent capped recovery performance in addition to other benefits such as reliable printing over extended periods of time, high durability, high optical density, good edge acuity, and reduction in intercolor bleed. Furthermore, this novel ink composition does not require under-printing with a fixer (i.e., a fixer solution is dispensed onto the print medium prior to dispensing the ink) as is common in inkjet printing to achieve good print quality.

Self-Dispersed Carbon Black Pigment

Raw pigment is insoluble and typically non-dispersible in the ink liquid carrier and must be treated in order to form a stable dispersion. Dispersants are often required to produce a stable dispersion of pigment. However, the use of dispersants increases the viscosity of the pigment dispersion. Such increase in viscosity is an issue if used in inkjet inks because inkjet inks have viscosity limitations. According to the present disclosure, the carbon black pigment is stabilized to disperse in the aqueous vehicle by self dispersion prior to being incorporated into an ink formulation. Self-dispersed pigment refers to pigment particles with surfaces which have been chemically modified with hydrophilic dispersibility-imparting groups that allow stable dispersion in an aqueous environment without the addition of a separate dispersant. Self-dispersion of pigment colorants such as carbon black may be achieved by a number of ways including, but not limited to, oxidation by ozone (as disclosed in, for example, U.S. Pat. No. 6,852,156), or reaction with a water solution of hypochlorite, or by attaching a carboxyl carrying aromatic compound by diazo coupling reaction (as disclosed in, for example, U.S. Pat. No. 5,851,280).

In a preferred embodiment, the novel ink composition contains about 1.0% to about 6.0% by weight of self-dispersed carbon-based pigment, more preferably 2.5% to 3.5% by weight, based on the total weight of the ink composition.

Counter Ions

Pigments in pigment dispersions are typically stabilized by the charges on the pigment surface. When the dispersed pigment is stabilized by negative charges, the counter ions may be univalent cations. Counter ions are ions of opposite charge to the ionic groups present at the surface of the self-dispersed pigment particle and provide electro-neutrality to the dispersion. The counter ions suitable for the novel ink composition include alkali metal counter-ions such as lithium (Li+), sodium (Na+) or potassium (K+). Dispersions containing the alkali metal counter-ions may be prepared when the self-dispersed, carbon black pigment dispersions are made. For example, when the pigment dispersion is made by oxidation with ozone, the reaction may be quenched with LiOH, NaOH or KOH to produce a dispersion wherein the counter ion is lithium (Li+), sodium (Na+) or potassium (K+), respectively. The counter ion may also be changed after the pigment dispersion has been made, for example, by diafiltering the dispersion with a salt of the desired counter ion. It has been discovered that, in certain embodiments, pigmented ink with potassium (K+) counter ions yields excellent capped recovery over an extended periods of time (12 weeks or more) as compared to pigmented ink with lithium (Li+) counter ions.

The preferred level of counter-ions in the novel ink composition is in the range of 800-1800 ppm (parts per million), more preferably 1000-1300 ppm as measured by an inductively-coupled plasma optical emission spectrometer (ICP-OES), e.g, Perkin Elmer 3000DV ICP-OES. The procedure for ICP-OES analysis is described below.

Procedure for Determination of Metals in Inks and Dyes by ICP-OES

Approximately 0.1 mL (milliLiter) of ink sample is dispensed into a tared 15-mL polypropylene centrifuge tube. The ink mass is recorded to 0.0001 g and the sample brought to approximately 10 mL volume with deionized (DI) water, weighed and the mass recorded. A minimum of two check standards bracket measure sample concentrations. Germanium is used as an internal standard to account for any difference between the sample matrix and calibration standards. Different wavelengths with varied sensitivities are monitored depending upon elemental concentrations. Reported values are the mean of three consecutive replicate measurements and are corrected for dilution. The verification limit is the lowest concentration of an analyte that has been determined with acceptable precision and accuracy under the stated conditions of this method.

Polyurethane

Polyurethane binders are added to pigmented inks to provide durability to the printed image. In addition to diol components and diisocyanate components, the polyurethane polymers also contain acid bearing monomer components. The latter serves to impart colloidal stability to the polymer by electrostatic stabilization. A wide range of polyurethanes have been found to be useful. However, those with a molecular weight in the range from 6000 to 500,000 AMU (atomic mass units or grams per mole) and an acid number in the range from 30 to 75 mg KOH/g polymer are preferred. Acid number is defined as the weight of potassium hydroxide in milligrams that is needed to neutralize 1 gram of polymer on a dry weight basis. In preferred embodiments, polyurethane is present in the ink composition in an amount within the range of about 0.1% to about 3.0% by weight, preferably from 0.5% to 1.5% by weight, based on the total weight of the ink composition.

Aqueous Carrier

As used herein, "aqueous carrier" refers to a liquid composition that is used to carry pigments to a print medium such as paper. The aqueous carrier of the novel ink composition is comprised of water, one or more water-soluble organic solvents, one or more surfactants. The organic solvents may be selected from the group consisting of 2-pyrrolidinone (2P), 1-(2-hydroxyethyl)-2-pyrrolidinone (2HE2P), glycerol polyoxyethyl ether (LEG-1), 1,3-Bis(2-Hydroxyethyl)-5,5-Dimethylhydantoin (Dantocol® DHE), and combinations thereof. Suitable surfactants include ethoxylated acetylene diols such as Surfynol® 465 available from Air Products and Chemicals, Inc., phosphate ester surfactants such as Crodafos™ N3 (oleth-3 phosphate) or Crodafos™ N10 (oleth-10 phosphate) from Croda Inc. In preferred embodiments, the aqueous ink carrier contain, in weight percentage based on total weight of the ink composition, 5-14% 2P, 0-5% 2HE2P, 0-3% LEG-1, and 7-10% Dantocol® DHE. It has been found that inks made within these ranges provide optimum benefits including good decap performance.

The term "decap," as used herein, means the ability of the inkjet ink to readily eject from the print head of the ink pen, upon prolonged exposure to air. The ink decap time is measured as the amount of time that an ink printhead may be left uncapped before the printer nozzles no longer fire properly, potentially because of clogging or plugging. If a nozzle has been plugged, ink droplets ejected through the nozzle's orifice may be misdirected, which may adversely affect print quality. The orifice may also become completely blocked, and as a result the ink droplets may not pass through the affected nozzle. Inkjet ink decap times are typically measured over short and long time periods. The short-time decap generally determines how long the printhead can be uncapped before drop quality degrades below the quality obtained with a freshly uncapped print head. Various printed image defects may result from this drop quality degradation due to decap. To counteract decap effects, the printer service routine usually requires the idle nozzles to spit on a regular basis into the waste container (spittoon) to avoid printing defects. In order to achieve good print image quality, while maintaining or improving throughput and saving ink, it is desirable to keep the short-time decap as long as possible, and to use as few spits as possible to refresh the nozzles. On the other hand, long-time decap determines how long a printhead can be stored in an uncapped state, before nozzles are no longer readily recoverable by the printer's servicing routines. In particular, it determines attributes of the printhead, such as, for example, the storage stability. Long-time decap is desirable for inks so that nozzles are able to be left uncapped and unused for extended periods of time, while the printheads can still be revived by servicing.

In one embodiment, the aqueous carrier further includes an additive to minimize "halo" formation in addition to the components discussed above. This additive has a polar head group, which is more polar than a hydroxyl group, and a $C_8$-$C_{18}$ hydrocarbon tail. The polar head group may include, but is not limited to, sulfate, sulfonate, phosphate, carboxylate, carboxamide. Examples of such additive include oleic acid, elaidic acid, and linoleic acid. Many inkjet printers can produce multicolor images by ejecting different color inks (e.g. cyan, magenta, yellow in addition to black). The mixing of different inks near the border area, commonly referred to as "intercolor bleed", results in reduced print image quality. One approach to balancing the need for sharp edge acuity in the text, while minimizing bleed, has been to select a black ink exhibiting high surface energy for use with colored inks having low surface energies. Unfortunately, this approach is prone to produce a white or weakly colored region, referred to as "halo", at the interface of the black ink and colored inks. This tendency of halo formation causes a loss of image optical density, and a loss of image quality, at the ink interface. Thus, there is a need for improved inks that retain sharp edge acuity for printed text, have minimum bleed, and do not present the halo formation problem observed at the interface of black ink and colored inks. It has been found that the presence of oleic acid in the aqueous carrier results in a black ink with reduced halo formation. Furthermore, halo control can be achieved without using any conventional fluorinated surfactants, thereby rendering the ink composition more environmentally friendly. When anti-halo additive is used, it is present in an amount of about 0.05% to about 0.5% by weight, more preferably, 0.1% to 0.5% by weight, based on the total weight of the ink composition. Beyond 0.5% of oleic acid, black to color bleed becomes worse.

Optional Ink Additives

Optional ink additives such as buffers, biocides, sequestering agents, chelating agents, or the like, may be included in the ink composition. As used herein, the term "additives" refers to constituents of the ink that operate to enhance performance, environmental effects, aesthetic effects, or other similar properties of the ink. As a non-limiting example, a biocide such as Proxel® GXL, may be added to the ink to protect the ink from bacterial growth.

Concentrations, amounts, and other numerical data may be expressed or presented herein in a range format. It is to be understood that such a range format is used merely for convenience and brevity and thus should be interpreted to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc.

EXAMPLES

The following Examples will serve to illustrate representative embodiments of the present disclosure and should not be construed as limiting of the disclosure in any way. All percentages (%) are by weight unless otherwise indicated.

Two inks were made using self-dispersed carbon black pigment dispersions at 4% pigment load in accordance with the formulation Ink 1 below. The pigment dispersions were made by the same process, the only difference between the dispersions was the counter-ion. One of them had Li counter ions while the other had K counter-ions.

Ink 1
Self-dispersed carbon black pigment: 4%
2-Pyrrolidinone: 10%
LEG-1: 4%
Surfynol 465: 0.2%
Proxel GXL: 0.2%
Balance water Capped Recovery Testing The inks were filled in Hewlett-Packard HP88 pens and printed using an Officejet Pro K5400 inkjet printer. The pens were then stored in storage fixtures similar to the way they would be stored in the printer when not being used. The storage fixtures were arranged so that the pens were stored at a five degree tilt. The pens were pulled at regular intervals and printed as a test to assess nozzle health. At least two pens per ink were tested at each time point.

When a freshly filled pen is printed, the swath height is 22 mm. Because of the tilt in pen storage, if there is any pigment settling, the nozzles at the lower end of the tilt generally do not print well resulting in a print swath that is less than 22 mm. If this settling is not catastrophic, the nozzles may be recovered by successive acts of pen servicing in the printer. TABLE 1 below summarizes the results of this experiment.

TABLE 1

| Counter ion | Initial | 4 weeks | 8 weeks | 12 weeks |
|---|---|---|---|---|
| Li | 22 mm | 14 mm | 12 mm | 6 mm |
| K | 22 mm | 21 mm | 20 mm | 18 mm |

In TABLE 1 above, the number in each cell corresponds to the height of the print swath without any type of servicing. As can be seen, the amount of settling is more severe when the counter ion is Li as compared to when it is K, i.e. the height of the print swath is significantly reduced over the period of 12 weeks. In addition, the pens could not be recovered at eight weeks and twelve weeks when the counter-ion is Li, whereas in the case of K counter-ions, the pens were recoverable to acceptable levels of nozzle health even after capped storage for twelve weeks.

Two additional inks were prepared according to the following formulations:

| Ink 2 | |
|---|---|
| Self-dispersed carbon black pigment | 4.0% |
| Polyurethane polymer | 0.7% |
| 2-Pyrrolidinone | 6.0% |
| 1,5-Pentanediol | 4.5% |
| LEG-1 | 4.4% |
| Surfynol 465 | 0.1% |
| Proxel GXL | 0.2% |
| Balance deionized water | |

| Ink 3 | |
|---|---|
| Self-dispersed carbon black pigment | 3.0% |
| Polyurethane polymer | 0.7% |
| 2-Pyrrolidinone | 12.5% |
| Dantocol DHE | 9.0% |
| Surfynol 465 | 0.2% |
| Oleic acid | 0.15% |
| Proxel GXL | 0.18% |
| Balance deionized water | |

In both inks Ink 2 and Ink 3, the same carbon black pigment dispersion and polyurethane polymer were used. The pigment dispersion used is the same as the potassium form of the pigment dispersion used for Ink 1 formulation described above. The only difference is the aqueous ink carrier. The level of K counter ions in Ink 2 and Ink 3 is about 1000 ppm with no detection of Li counter ions as determined by Perkin Elmer 3000DV ICP-OES.

Both Ink 2 and Ink 3 were subjected to a "shelf life" test where the ink is stored in an oven at 60° C. and the pigment particle size is measured weekly. When the pigment particle size grows over 10% from the initial value, the ink is considered to have failed in the test. Both the inks made with vehicle 2 and vehicle 3 passed the test for up to 6 weeks.

Ink 2 and Ink 3 were also subjected to capped recovery testing as described above. The inks were filled in Hewlett-Packard HP88 pens and printed using an Officejet Pro K5400 printer. The pens were then stored in storage fixtures similar to the way they would be stored in the printer when not being used. The storage fixtures were so arranged that the pens were stored at a five degree tilt. Pens were pulled at regular intervals and print tested to assess nozzle health. At least two pens per ink were tested at each time point. When a freshly filled pen is printed, the swath height is 22 mm. In the case of Ink 2 and Ink 3, the pens were recovered with minimal servicing after both eight and twelve weeks of storage in capped fixtures. However, there was one crucial difference. Ink 3 sustained excellent nozzle health through multiple pages of printing after recovery whereas Ink 2, though seemed to recover as easily, did not sustain the same nozzle health through subsequent printing.

Another ink was prepared according to the following formulation:

| Ink 4 | |
|---|---|
| Self-dispersed carbon black pigment | 3.0% |
| Polyurethane polymer | 0.7% |
| 2-Pyrrolidinone | 10.5% |
| 1-(2-hydroxyethyl)-2-pyrolidinone | 2.4% |
| Dantocol DHE | 8.6% |
| Surfynol 465 | 0.2% |
| Oleic acid | 0.15% |
| Proxel GXL | 0.18% |
| Balance deionized water | |

Decap performance (ease of nozzle recovery after nozzle has been idle for short periods) was determined for Ink 3 (from EXAMPLE 2) and Ink 4. Decap performance, as defined by the number of spits to recover after 16 seconds idle time of Ink 3 and Ink 4, were 4 and 3 spits per nozzle, respectively—which was a good result. When the LEG concentration was raised to 5%, in either ink, the decap performance degraded to 15 spits per nozzle. When the 2-Pyrrolidinone concentration of Ink 4 was lowered to 3%, the decap performance was degraded to 6 spits per nozzle. These results show that having the right amounts of organic solvents is critical to decap performance.

Halo Performance

Halo formation was measured for Ink 2 and Ink 3 by printing a specific pattern that includes a uniform pattern of color dots in the midst of a black block pattern. When halo is really bad, the color dots show very well in the middle of the black block. Halo values were then quantitatively determined using a scanner and a metrology algorithm. According to this measurement, a lower number for halo value is better with anything less than zero being ideal. For comparison, Comparative ink 3a, which is similar to Ink 3 but without oleic acid, and Comparative ink 3b, which is similar to Ink 3 but has oleyl alcohol instead of oleic acid, were also prepared and subjected to the same halo measurement. TABLE 2 shows the results of the halo measurement.

TABLE 2

| Ink | Halo value |
|---|---|
| Ink 2 | 11.28 |
| Ink 3 | −4.19 |
| Comparative ink 3a (no oleic acid) | 3.54 |
| Comparative ink 3b | 11.35 |

TABLE 2-continued

| Ink | Halo value |
|---|---|
| (with oleyl alcohol instead of oleic acid) | |

As can be seen from TABLE 2, Ink 3 has the best performance with regard to halo. Comparative ink 3b with oleyl alcohol is not as good as Ink 3 in preventing halo. The main difference between oleic acid (carboxyl head group) and oleyl alcohol (alcohol head group) is in the head group.

Although the present disclosure describes certain representative embodiments and examples, it will be understood to those skilled in the art that various modifications may be made to these representative embodiments and examples without departing from the scope of the appended claims.

What is claimed is:

1. An ink composition for inkjet printing, comprising:
a self-dispersed carbon black pigment with alkali metal counter ions in an amount ranging from about 1.0% to about 6.0% by weight based on the total weight of the ink composition, the alkali metal counter ions being a single cationic species selected from the group consisting of sodium cations, lithium cations, and potassium cations;
polyurethane in an amount ranging from about 0.1% to about 3.0% by weight based on the total weight of the ink composition; and
an aqueous carrier making up the balance, said aqueous carrier comprising water, at least one water-soluble organic solvent, at least one surfactant, and an anti-halo additive selected from the group consisting of oleic acid, elaidic acid, and linoleic acid, wherein the anti-halo additive is present in an amount ranging from about 0.05 to about 0.5% by weight based on the total weight of the ink composition;
wherein the concentration of the alkali metal counter ions is in the range of 800-1800 ppm.

2. The ink composition of claim 1, wherein the alkali metal counter ions consist of potassium counter ions.

3. The ink composition of claim 1, wherein said anti-halo additive is oleic acid.

4. The ink composition of claim 3, wherein said oleic acid is present in an amount of about 0.1% to about 0.5% by weight based on the total weight of the ink composition.

5. The ink composition of claim 1, wherein said polyurethane has an acid number ranging from 30 to 75 mg KOH/g polymer.

6. The ink composition of claim 1, wherein said polyurethane is present in an amount ranging from about 0.5% to 1.5% by weight based on the total weight of the ink composition.

7. The ink composition of claim 1, wherein said at least one water-soluble organic solvent is selected from the group consisting of 2-pyrrolidinone, 1-(2-hydroxyethyl)-2-pyrrolidinone, glycerol polyoxyethyl ether, and 1,3-Bis(2-Hydroxyethyl)-5,5-Dimethylhydantoin.

8. The ink composition of claim 1, wherein the aqueous carrier comprises, in weight percentage based on total weight of the ink composition:
5.0%-14.0% 2-pyrrolidinone, and
7.0%-10.0% 1,3-Bis(2-Hydroxyethyl)-5,5-Dimethylhydantoin.

9. The ink composition of claim 8, wherein the aqueous ink carrier further comprises more than 0% and up to 5.0% 1-(2-hydroxyethyl)-2-pyrrolidinone.

10. The ink composition of claim 1, wherein the aqueous carrier comprises, in weight percentage based on total weight of the ink composition:
5.0%-14.0% 2-pyrrolidinone, and
more than 0% and up to 3.0% glycerol polyoxyethyl ether.

11. An ink composition for inkjet printing, comprising:
a self-dispersed carbon black pigment with a single cationic species consisting of potassium counter ions in an amount ranging from about 1.0% to about 6.0% by weight based on the total weight of the ink composition;
polyurethane in an amount ranging from about 0.1% to about 3.0% by weight based on the total weight of the ink composition; and
an aqueous carrier making up the balance, said aqueous carrier comprising water, at least one water-soluble organic solvent, at least one surfactant, and oleic acid in an amount ranging from about 0.05% to about 0.5% by weight based on the total weight of the ink composition;
wherein the concentration of the potassium counter ions is in the range of 800-1800 ppm;
and wherein the ink composition reduces halo formation at an interface of a colored ink and the ink composition when printed on a medium.

12. The ink composition of claim 1, wherein said polyurethane has an acid number ranging from 30 to 49 mg KOH/g polymer.

13. The ink composition of claim 1 wherein:
the alkali metal counter ions are potassium metal counter ions;
the amount of the self-dispersed carbon black pigment is about 3% by weight based on the total weight of the ink composition;
the amount of the polyurethane is about 0.7% by weight based on the total weight of the ink composition;
the at least one water-soluble organic solvent is a combination of 2-pyrrolidinone and 1,3-Bis(2-Hydroxyethyl)-5,5-Dimethylhydantoin, wherein the 2-pyrrolidinone is present in an amount ranging from about 10.5% to about 12.5% by weight based on the total weight of the ink composition, and the 1,3-Bis(2-Hydroxyethyl)-5,5-Dimethylhydantoin is present in an amount ranging from about 8.6% to about 9% by weight based on the total weight of the ink composition;
the aqueous carrier optionally includes 1-(2-hydroxyethyl)-2-pyrrolidinone) in an amount of about 2.4% by weight based on the total weight of the ink composition;
the at least one surfactant is present in an amount of about 0.2% by weight based on the total weight of the ink composition;
the anti-halo additive is oleic acid, and the amount of the oleic acid is about 0.15% by weight based on the total weight of the ink composition;
a biocide is present in an amount of about 0.18% by weight based on the total weight of the ink composition; and
a balance of the ink composition is the water.

14. The ink composition of claim 1 wherein the ink composition reduces halo formation at an interface of a colored ink and the ink composition when printed on a medium.

* * * * *

UNITED STATES PATENT AND TRADEMARK OFFICE
CERTIFICATE OF CORRECTION

PATENT NO. : 9,187,665 B2
APPLICATION NO. : 13/577980
DATED : November 17, 2015
INVENTOR(S) : Vasudevan et al.

It is certified that error appears in the above-identified patent and that said Letters Patent is hereby corrected as shown below:

In the claims

Column 7, line 34, Claim 1, delete "0.05" and insert -- 0.05% --, therefor.

Column 8, line 49, Claim 13, delete "pyrrolidinone)" and insert -- pyrrolidinone --, therefor.

Signed and Sealed this
Nineteenth Day of July, 2016

Michelle K. Lee
*Director of the United States Patent and Trademark Office*